Feb. 20, 1940.  E. F. WICKENS  2,190,855
LOCATING DEVICE
Filed Jan. 19, 1938
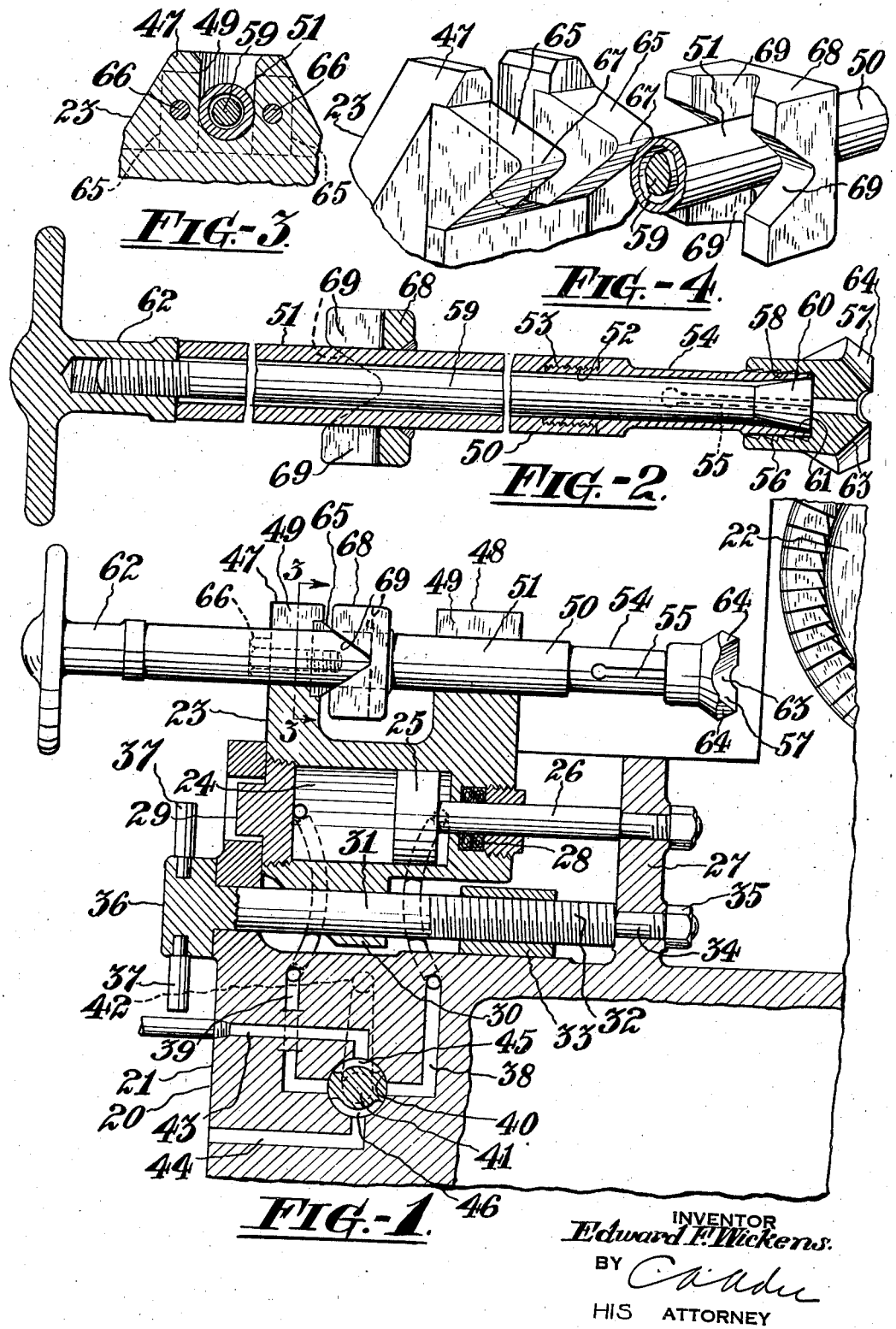
INVENTOR
Edward F. Wickens.
BY
HIS ATTORNEY Patented Feb. 20, 1940

2,190,855

UNITED STATES PATENT OFFICE 2,190,855

LOCATING DEVICE

Edward F. Wickens, Phillipsburg, N. J., assignor to Ingersoll-Rand Company, Jersey City, N. J., a corporation of New Jersey Application January 19, 1938, Serial No. 185,645

4 Claims. (Cl. 90—59)

This invention relates to locating devices and is more particularly intended for use in holding and locating articles requiring machining at definitely spaced points, as for example drill bits of the detachable cruciform type of which the cutting wings are uniformly spaced with respect to each other on the cutting end of the bit.

One object of the invention is to enable the work to be expeditiously located with respect to the implement or tool intended to operate thereon.

Other objects will be in part obvious and in part pointed out hereinafter.

In the drawing accompanying this specification and in which similar reference numerals refer to similar parts, Figure 1 is a longitudinal elevation of a portion of a milling machine equipped with a locating device constructed in accordance with the practice of the invention, Figure 2 is a longitudinal view, partly in section, of a work holder or chuck intended to be carried by the milling machine for presenting the work to the cutting element of said machine, Figure 3 is a transverse view taken through Figure 1 on the line 3—3, and Figure 4 is a perspective view showing a portion of the work holder and a locating element carried by the milling machine and the work holder and which cooperate with each other to locate the work in correct operative relationship with respect to the cutter of the milling machine.

Referring to the drawing and at first more particularly to Figure 1, 20 designates a milling machine comprising a main frame 21 and a form-milling cutter 22 which may be driven by any suitable power device (not shown).

The machine 20 is provided with a carriage 23 which is reciprocable with respect to the cutter 22 and has a bore to provide a piston chamber 24 for the accommodation of a piston 25. The piston is stationary, being held thus by the piston rod 26 which is secured to a wall 27 of the main frame. The bore in the carriage 23 through which the rod 26 extends is sealed by packing 28, and the opposite end of the piston chamber 24 is sealed by a closure 29 threaded into the end of the piston chamber.

On the lower part of the carriage 23 is a lug 30 which is slidable upon a guide member 31 in the form of a rod secured to the main frame. A portion 32 of the rod lying within the frame 21 is threaded to a stop member 33 which is adjustable longitudinally of the carriage 23 and lies in the path of the lug 30 which engages the stop member 33 to limit the feeding movement of the carriage 23. On the inner end of the rod 31 is a reduced portion 34 extending through the wall 27 and having a nut 35 threaded thereon to lock the rod 31 to said wall. The rod 31 is, moreover, provided with a head 36 which lies exteriorly of the frame 21 and carries spokes 37 providing grip members for rotating the rod and thereby shifting the stop member 33.

The pressure fluid employed for actuating the carriage 23 is conveyed to the ends of the piston chamber 24 by conduits 38 and 39 leading from a valve chamber 40 in the main frame 21. The valve chamber contains a rotary valve 41 having a handle 42 whereby it may be manipulated, and pressure fluid is conveyed to the valve chamber from a suitable source of supply (not shown) by a passage 43 opening into the valve chamber intermediate the passages 38 and 39.

The valve chamber has an exhaust port 44 which also opens into the valve chamber intermediate the passages 38 and 39 and is located diametrically opposite the supply passage 43. The points of communication of the passages 38, 39, 43 and 44 with the valve chamber 40 may, as indicated, be in the same transverse plane and in the periphery of the valve are a pair of partly annular grooves 45 and 46 of which the latter affords communication between the exhaust passage 44 and the passages 38 and 39 and the groove 45 communicates the supply passage 43 with the passages 38 and 39.

In the operation of the apparatus thus far described, whenever it is desired to actuate the carriage 23 toward the cutter 22 the valve 41 is rocked to a position in which the groove 45 establishes communication between the supply passage 43 and the conduit 38. In this position of the valve the passage 39 will be in communication with the exhaust passage 44 through the groove 46. The pressure fluid thus admitted into the piston chamber 24 will move the carriage 23 in the direction of the cutter until the lug 30 abuts the stop member 33, thereby determining the depth of cut into the work.

When the carriage 23 comes to rest the valve 41 is rotated to another limiting position in which the conduit 39 is in communication with the supply passage 43 through the groove 45 and the passage 44 is in communication with the conduit 38 through the groove 46. The carriage will then be retracted to its initial position by the pressure fluid entering the piston chamber 24 through the conduit 38.

In the event that it may be desired to shorten or lengthen the distance of travel of the carriage 23 the nut 35 is partly unthreaded on the extension 34. The rod 31 may then be rotated in the direction necessary to move the stop member 33, either toward or away from the wall 27, after which the nut 35 is again tightened to hold the rod 31 immovable.

In accordance with the practice of the invention, the carriage 23 is provided on its upper surface with a pair of projections 47 and 48 which are located at the rear and front ends, respectively, of the carriage. In the projections are vertical slots 49, opening from the upper ends of the projections, to receive a work holder 50 resting upon the bottoms of the slots 49 which are, accordingly, shaped to conform to the contour of the work holder.

The work holder 50 comprises a sleeve 51 having internal threads 52 at its front end for the accommodation of a threaded end 53 of a chuck 54. The front or free end of the chuck 54 is expansible having longitudinally extending slots 55 opening from the front end of the chuck, and on the periphery of the free end of the chuck is a bearing surface 56 which extends into the work, as for example a drill bit 57 of the detachable type having a threaded socket 58 for attachment to a drill rod (not shown).

Within the sleeve 51 and the chuck 54 is an expansion member 59 in the form of a rod having a coniform end 60 to engage a similar surface 61 in the free end of the chuck for expanding the chuck against the work. The rod 59 projects from the rearward end of the sleeve 51 and is in threaded engagement with a latch nut 62 whereby the rod is shifted longitudinally of the sleeve and the chuck.

The carriage and the work holder are provided with suitable devices adapted to cooperate with each other to determine the correct positions of the points of the work intended to be presented to the cutter 22. In the present instance, these points are the grooves 63 between and defining the sides of the cutting wings 64 of the drill bit so that where, as in a cruciform bit, four cutting positions are required, the work holder may be conveniently shifted to and held in such positions. To this end the projection 47 carries a pair of V-shaped blocks 65 which are located on the opposite sides of the slot 49 and are secured in position by screws 66.

The blocks 65 are so arranged that their apices 67 lie in the horizontal plane of the work holder 50 and normal to the direction of movement of the carriage, and on the sleeve 51 is a locating member 68 having a series of V-shaped notches 69 arranged in cruciform fashion to receive the V-portions of the blocks 65.

In the operation of the device, the chuck is inserted into the work and the nut 62 is then manipulated to draw the coniform end 60 into the chuck and thereby press the bearing surface 56 into firm gripping engagement with the work. The work holder is then placed in the slots 49 and moved to position in which the blocks 65 lie in a pair of notches 69 where it is held by the operator. Thereafter the carriage 23 is actuated toward the cutter 22 to cut a groove 63 into the face of the drill bit.

After a groove of the desired depth has been cut, that is to say, when the lug 30 contacts the stop member 33, the carriage 23 is retracted and the work holder is rotated a quarter turn and again positioned to bring the blocks 65 into engagement with another pair of notches 69 preparatory to another cutting operation.

I claim:

1. In a locating device, the combination of a cutter and a carrier, said carrier having a recess, means for causing relative reciprocatory movement between the cutter and the carrier, a work holder freely insertable into and removable from the recess, means on the carrier and the work holder cooperating with each other to determine the spacing of points on the work intended to be presented to the cutter, and a grip portion on the work holder for manually maintaining said means in engagement with each other and for holding the work holder in the recess.

2. In a locating device, the combination of a cutter and a carrier reciprocable with respect to the cutter, said carrier having a recess, a work holder freely insertable into and removable from the recess, means on the carrier and the work holder interlockingly engaging each other in different operative positions of the work holder to determine the spacing of points on the work intended to be presented to the cutter, and a grip portion on the work holder for manually maintaining said means in engagement with each other and for holding the work holder in the recess.

3. In a locating device, the combination of a cutter and a carrier reciprocable with respect to the cutter, said carrier having a recess, a work holder freely insertable into and removable from the recess and being shiftable about its axis to present different points of the work to the cutter, a locating member on the carrier, means on the holder having recesses equalling the number of operative positions of the work to receive the locating member, and a grip portion on the work holder for manually maintaining said means in engagement with each other and for holding the work holder in the recess.

4. In a locating device, the combination of a cutter and a carrier reciprocable with respect to the cutter, said carrier having a recess, a work holder removable from the recess and being shiftable about its axis to present different points of the work to the cutter, a grip portion on the work holder for manually holding the work holder in the recess, and means on the work holder having converging surfaces to engage the locating member and thereby locate the work in correct operative position with respect to the cutter.

EDWARD F. WICKENS.